(12) United States Patent
Wang

(10) Patent No.: US 7,133,745 B2
(45) Date of Patent: Nov. 7, 2006

(54) METHOD FOR COMPENSATING ROTATIONAL POSITION ERROR OF ROBOT CLEANER

(75) Inventor: Hee Il Wang, Seoul (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 10/672,450

(22) Filed: Sep. 26, 2003

(65) Prior Publication Data

US 2004/0128031 A1 Jul. 1, 2004

(30) Foreign Application Priority Data

Dec. 31, 2002 (KR) ...................... 10-2002-0088350

(51) Int. Cl.
*G05B 15/00* (2006.01)
*G05B 19/00* (2006.01)

(52) U.S. Cl. ...................... 700/258; 700/245; 318/581; 318/587; 701/2; 701/23; 701/209; 342/357.15; 340/988; 340/995.1; 180/169; 180/443; 180/6.5

(58) Field of Classification Search ................ 700/258, 700/245; 701/2, 23, 209, 207, 213; 56/202, 56/295, 320, 16.4 A, 16.8; 318/581, 587; 342/357.15, 357.06, 357.17; 340/988, 995.1; 180/169, 443, 6.5
See application file for complete search history.

(56) References Cited

U.S. PATENT DOCUMENTS 5,469,158 A * 11/1995 Morita ........................ 340/988
5,646,494 A * 7/1997 Han ............................ 318/587
6,338,013 B1 * 1/2002 Ruffner ........................ 701/23
6,502,017 B1 * 12/2002 Ruffner ........................ 701/23
6,600,981 B1 * 7/2003 Ruffner ........................ 701/23
6,611,738 B1 * 8/2003 Ruffner ........................ 701/23
6,650,975 B1 * 11/2003 Ruffner ........................ 701/23
2002/0165654 A1 11/2002 Weaver et al.

FOREIGN PATENT DOCUMENTS

| EP | 0 451 988 A1 | 10/1991 |
|---|---|---|
| EP | 0 496 172 A1 | 7/1992 |
| EP | 0 685 705 A1 | 12/1995 |
| JP | 62-254212 | 6/1987 |

* cited by examiner

*Primary Examiner*—Thomas G. Black
*Assistant Examiner*—McDieunel Marc
(74) *Attorney, Agent, or Firm*—Lee, Hong, Degerman, Kang & Schmadeka

(57) ABSTRACT

A method for compensating a rotational position error of a robot cleaner is disclosed to reduce a rotational position error of a robot cleaner by compensating an offset value of a gyro sensor of the robot cleaner. The method includes: detecting an offset value of a sensor for detecting a rotational speed of a robot cleaner; compensating the detected offset value; and correcting a rotational position of the robot cleaner on the basis of the compensated offset value.

20 Claims, 3 Drawing Sheets

METHOD FOR COMPENSATING ROTATIONAL POSITION ERROR OF ROBOT CLEANER

BACKGROUND OF THE INVENTION

1. Field of the Invention

The present invention relates to a robot cleaner and, more particularly, to a method for compensating a rotational position error of a robot cleaner, which is capable of minimizing a rotational position error of a robot cleaner.

2. Description of the Background Art

In general, a robot cleaner is operated by the steps of detecting a region for a cleaning operation along a wall surface of a room (e.g., a living room or the inner room) of a house and returning to an original position; performing a cleaning operation along the cleaning path of the detected cleaning region; and moving to a charger and automatically charging a battery of a robot cleaner when the cleaning operation is completed.

Thus, in each step of the cleaning operation, accurate calculation of positions of the robot cleaner (e.g., 'x'-axis direction, 'y'-axis direction or rotational direction) is a critical factor in determining a cleaning performance. Especially, a size of a rotational position error of the robot cleaner in the step of performing the cleaning operation in a certain pattern is crucial to the cleaning performance.

There are various methods for determining a position of the robot cleaner.

For example, one of methods for calculating an absolute position of the robot cleaner is using a GPS (Global Positioning System). However, in spite of its advantage of obtaining an absolute position, this method has a problem that if the GPS is used in a limited space such as in a building, the precision of the GPS is degraded. That is, the GPS can not be substantially employed in the building.

Another method is obtaining a rotational speed and a straight-forward speed from an encoder (not shown) installed in the robot cleaner and integrating the obtained rotational speed and the straight-forward speed in order to determine a relative position of the robot cleaner.

However, using of the encoder incurs a low cost in implementing the robot cleaner, but a rotational position error occurs due to a state of a bottom surface, an assembly error of the robot cleaner, a slip, or the like, and in addition, it is difficult to calculate the rotational position error.

A third method is obtaining a rotational position of the robot cleaner by integrating an angular velocity of gyro sensor, For example, the gyro sensor outputs 2.5 volt when the robot cleaner is not rotated. When the robot cleaner is rotated at an angular velocity of 90°/sec clockwise, the gyro sensor outputs 5.0 volt. When the robot cleaner is rotated at an angular velocity of 90°/sec counterclockwise, the gyro sensor outputs 0 volt. If a sensor value of the gyro sensor is 1.25 volt, it means that the robot cleaner is rotated at an angular velocity of 45°/sec counterclockwise.

However, in the present invention, an important fact was noted through various experiments and try-and-error that when a rotational position of the robot cleaner is calculated by using the gyro sensor, an offset value of the gyro sensor changes as time passes, and if the changed offset value is not compensated, the rotational position errors of the robot cleaner are accumulated.

That is, though the gyro sensor for measuring the rotational speed (angular velocity) has such advantages that an error of an encoder does not occur with respect to the state of the bottom surface, an external impact or in case of collision to an object, accumulation of the rotational position errors due to the offset value of the gyro sensor degrades the cleaning performance of the robot cleaner.

Meanwhile, conventional techniques with respect to the robot cleaner is disclosed in U.S. Pat. No. 5,440,216, and the gyro sensor of the robot cleaner is disclosed in the U.S. Pat. No. 5,646,494.

SUMMARY OF THE INVENTION

Therefore, an object of the present invention is to provide a method for compensating a rotational position error of a robot cleaner capable of reducing a rotational position error of a robot cleaner by compensating an offset value of a gyro sensor of the robot cleaner.

Another object of the present invention is to provide a method for compensating a rotational position error of a robot cleaner capable of minimizing a rotational position error of a robot cleaner by compensating an offset value of a gyro sensor of the robot cleaner whenever the robot cleaner temporarily stops.

Still another object of the present invention is to provide a method for compensating a rotational position error of a robot cleaner capable of minimizing a rotational position error of a robot cleaner by compensating an offset value of a gyro sensor of the robot cleaner after temporarily stopping the robot cleaner when the robot cleaner starts a cleaning operation by steps.

Yet another object of the present invention is to provide a method for compensating a rotational position error of a robot cleaner capable of minimizing a rotational position error of a robot cleaner by compensating an offset value of a gyro sensor of the robot cleaner when the robot cleaner temporarily stops in place to change its direction from that place in a state that a pre-set time elapses.

Another object of the present invention is to provide a method for compensating a rotational position error of a robot cleaner in which a sample average value of offsets of a gyro sensor when a robot cleaner temporarily stops is obtained, and if the sample average value is much different from an actual offset value of the gyro sensor, the robot cleaner temporarily stops and the offset value of the gyro sensor of the robot cleaner is compensated to thereby minimize a rotational position error of the robot cleaner.

To achieve these and other advantages and in accordance with the purpose of the present invention, as embodied and broadly described herein, there is provided a method for compensating a rotational position error of a robot cleaner including: detecting an offset value of a sensor for detecting a rotational speed of a robot cleaner; compensating the detected offset value; and correcting a rotational position of the robot cleaner on the basis of the compensated offset value.

To achieve the above objects, there is also provided a method for compensating a rotational position error of a robot cleaner including: detecting an offset value of a gyro sensor after stopping a robot cleaner for a predetermined time when the robot cleaner is in an offset compensation mode; obtaining an average value of the detected offset values and a standard deviation; averaging the noise-removed offset value on the basis of the average value and the standard deviation; determining the averaged offset value as a new gyro offset value; and compensating a rotational position error of the robot cleaner on the basis of the new gyro offset value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A method for compensating a rotational position error of a robot cleaner in which a rotational position error of a robot cleaner is reduced by minimizing a rotational position error of a robot cleaner by compensating an offset value of a sensor detecting a rotational speed of the robot cleaner in accordance with a preferred embodiment of the present invention will now be described.

Figure 1:
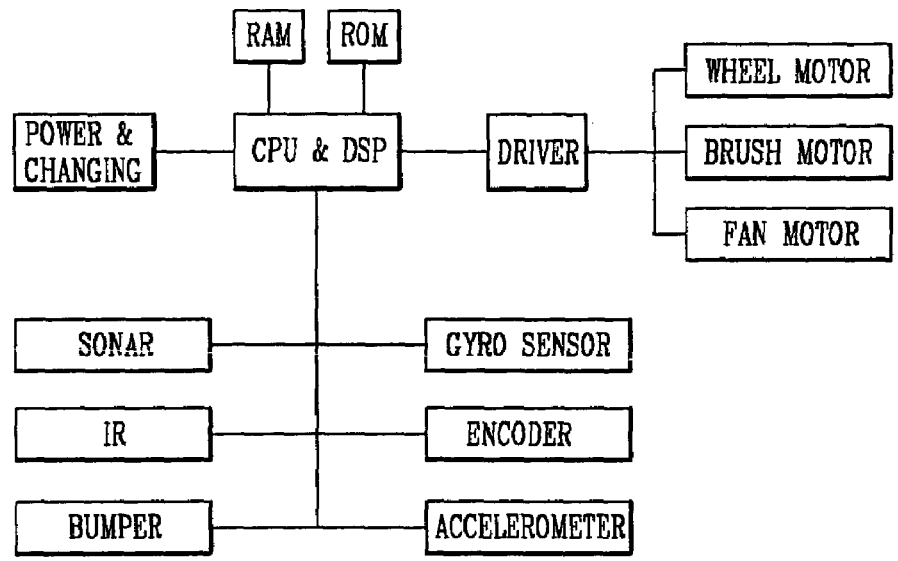
FIG. 1 is a block diagram showing a general construction of a robot cleaner.

FIG. 1 is a block diagram showing a general construction of a robot cleaner. A construction of a general robot cleaner related to the present invention will be described, while a description on a construction of the general robot cleaner which is not directly related to the present invention is omitted.

First, positions ($X_n$, $Y_n$, $\psi_n$) of the general robot cleaner are updated at every sampling time by the below equation (1):

$$X_{n+1} = X_n + \cos \Psi_n \cdot V_n \cdot \Delta t$$

$$Y_{n+1} = Y_n + \sin \Psi_n \cdot V_n \cdot \Delta t \qquad (1)$$

$$\Psi_{n+1} = \Psi_n + \omega_n \cdot \Delta t$$

wherein $X_n$, $Y_n$, $\psi_n$ are positions of a robot cleaner, $V_n$ is a speed of a forward direction of the robot cleaner, $\omega_n$ is an angular velocity of the robot cleaner, $\Delta t$ is a sampling time.

The speed of the forward direction ($V_n$) of the robot cleaner is obtained by using an accelerometer or an encoder as in the conventional art. $\Psi_{n+1}$ is a current rotational amount of the robot cleaner, $\psi_n$ is a previous rotational amount of the robot cleaner, and $\omega_n \cdot \Delta t$ is a rotational amount according to a current rotation speed.

Figure 2:
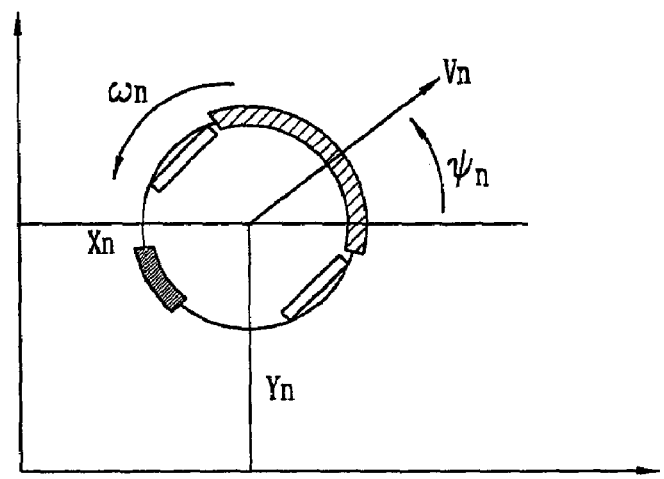
FIG. 2 illustrates a coordinate system applied for compensating a gyro offset value of a robot cleaner in accordance with a preferred embodiment of the present invention.

FIG. 2 illustrates a coordinate system applied for compensating a gyro offset value of a robot cleaner in accordance with a preferred embodiment of the present invention. That is, when the robot cleaner is initialized, the center of the robot cleaner is taken as the starting point of a coordinate axis. At this time, it is assumed that the forward direction of the robot cleaner is X axis and the perpendicular direction by 90° to X axis counterclockwise is Y axis. Positions of the robot cleaner in nth sampling are expressed by $X_n$, $Y_n$ and $\psi_n$. $\psi_n$ means an angle between X axis and the forward direction of the robot.

The angular velocity ($\omega_n$) of the robot cleaner is calculated on the basis of an output value of the gyro sensor. That is, the angular velocity ($\omega_n$) of the robot cleaner is calculated through the below equation (2), and a rotational position of the robot cleaner is calculated by accumulatively adding up the calculated angular velocities ($\omega_n$).

$$\omega_n = C(G_n - G_{offset}) \qquad (2)$$

wherein $G_n$ is an actual output value of the gyro sensor, $G_{offset}$ is an output value of the gyro sensor when an angular velocity of the robot cleaner is 0, that is, gyro offset value [mV], and 'C' is a scale vector [deg/sec/mV] for converting an output value of the gyro sensor into an angular velocity.

However, because an offset value of the gyro sensor is changed over time and an environment, the changed offset value of the gyro sensor should be compensated in order to accurately calculate a rotational position of the robot cleaner.

That is, in the present invention, as mentioned above, an important fact was noted through various experiments and try-and-error that when a rotational position of the robot cleaner is calculated by using the gyro sensor, an offset value of the gyro sensor changes as time passes, and if the changed offset value is not compensated, the rotational position errors of the robot cleaner are accumulated.

For example, a state that a speed error of 0.1 [deg/sec] has occurred due to a change in the gyro offset value is maintained for 10 minutes, a rotational position error of total 60 [deg]=(0.1×60×10) is generated. Accordingly, the automatic traveling robot cleaner, which performs a cleaning operation with map information, can not perform the cleaning operation due to the rotational position error of 60 [deg].

The method for compensating a rotational position error of a robot cleaner in accordance with the preferred embodiment of the present invention will now be described in detail with reference to FIG. 3 and FIGS. 4A–4D.

Figure 3:
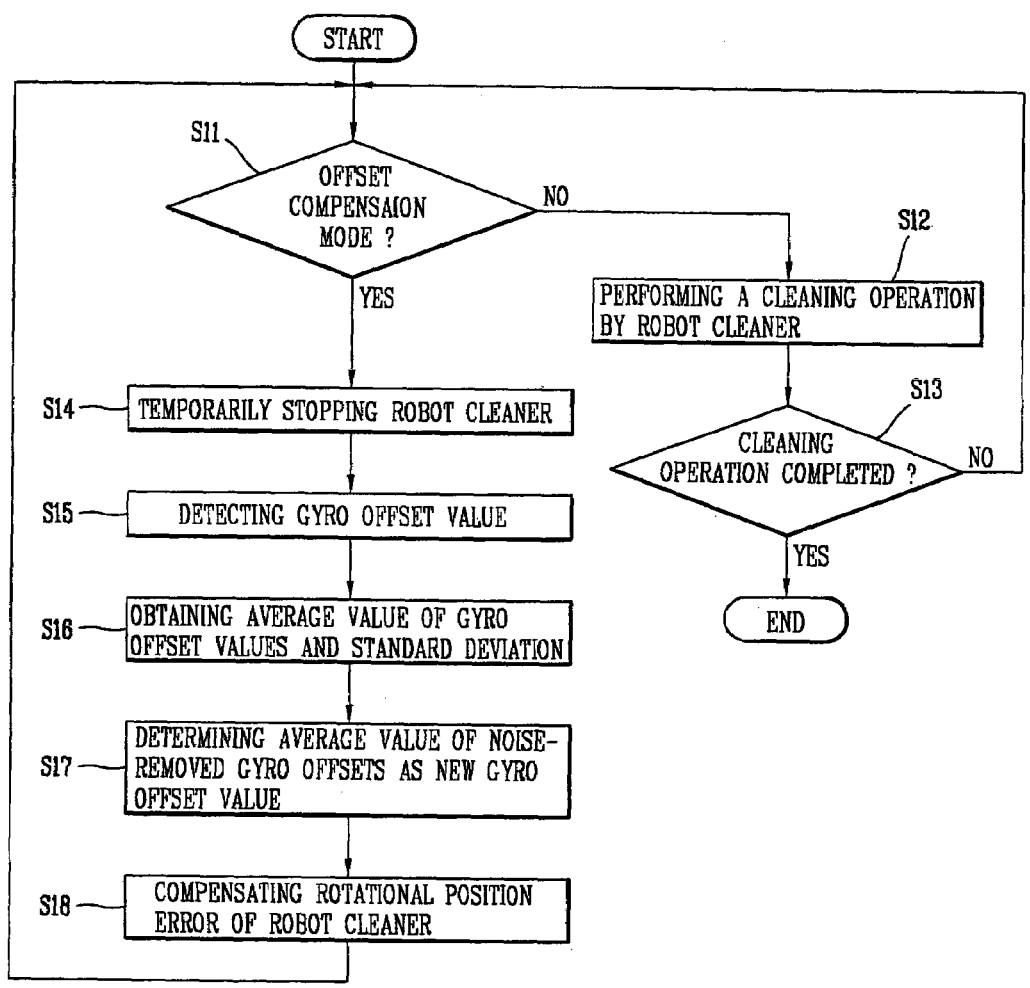
FIG. 3 is a flow chart of a method for compensating a rotational position error of the robot cleaner in accordance with the preferred embodiment of the present invention.

FIG. 3 is a flow chart of a method for compensating a rotational position error of the robot cleaner in accordance with the preferred embodiment of the present invention.

First, when the mode of the robot cleaner is changed to an offset compensation mode to correct an offset value of the gyro sensor, the robot cleaner performs an operation to correct a rotational position error of the robot cleaner. At this time, it is also preferred that the offset compensation mode is operated to correct the rotational position error of the robot cleaner when the robot cleaner temporarily stops (step S11).

Meanwhile, the mode of the robot cleaner is not the offset compensation mode for correcting an offset value of the gyro sensor, the robot cleaner performs a cleaning operation or a charging operation (step S12).

Thereafter, it is determined that the cleaning operation of the robot cleaner is complete. If the cleaning operation is not completed, it returned to the step S11 to determine whether the robot cleaner in the offset compensation mode (step S13).

The offset compensation mode is performed when the robot cleaner temporarily stops, or performed in various situations as necessary. That is, only when the robot cleaner is maintained in the stop state, the gyro offset value can be compensated without interruption to the cleaning operation and the charging operation. Accordingly, in the present invention, preferably, the robot cleaner temporarily stops in the below three cases and the offset compensation mode is performed (step S13).

First, preferably, when the robot cleaner starts a cleaning operation, the offset compensation mode is executed after the robot cleaner temporarily stops.

For example, after the robot cleaner temporarily stops, the offset compensation mode is executed at a point when the robot cleaner performs a cleaning operation along a wall (e.g., the wall of a living room of a house), at a point when a cleaning operation is performed in a certain pattern on the basis of a map created for a cleaning region, or at a point when the robot cleaner is moved to a charger and a battery of the robot cleaner is charged after the cleaning operation is completed.

Second, preferably, the offset compensation mode is performed at pre-set time intervals. For example, the offset compensation mode is performed after a pre-set time (e.g., 10 minutes) elapses and the robot cleaner temporarily stops while the cleaning operation is being performed by each step. That is, when the robot cleaner temporarily stops to change its direction from a current position after the pre-set time elapses, the offset value of the gyro sensor is compensated, thereby minimizing a rotational position error of the robot cleaner.

Third, preferably, the offset compensation mode is performed when the robot cleaner temporarily stops for the reason of a direction change during the cleaning operation. For example, the robot cleaner is rotated in the original place in order to change its direction, and in a stop state for a rotational direction for a short time of a start point and an end point. At this time, an output value of the gyro sensor is an actual offset value of the gyro sensor with a rotation speed of 0. At this time, a sample average value of the offsets of the gyro sensor is obtained and, if the obtained sample average value and an offset value of the gyro sensor used for calculation of an angular velocity are much different, preferably, the robot cleaner stops for a predetermined time and is performed. The sample average value of the gyro offsets is obtained by below equation (3):

$$G_{offset,sample} = \frac{\sum_{i=1}^{S} G_i}{S} \quad (3)$$

wherein 'S' is the number of samples of output values of the gyro sensor that can be collected when the robot cleaner instantly stops, $G_i$ is an output value of the gyro sensor when the robot cleaner instantly stops, and $G_{offset,sample}$ is an average value of output values of the gyro sensor when the robot cleaner instantly stops.

Accordingly, if a difference value between the average value ($G_{offset,sample}$) of the gyro sensor values calculated according to equation (3) and an offset ($G_{offset}$) value of the gyro sensor used for calculation of the actual angular velocity are much different, it means that the actual offset value of the gyro sensor has been changed. When the offset value of the gyro sensor is changed, the robot cleaner temporarily stops and the offset compensation is performed.

Thereafter, if the mode of the robot cleaner is changed to the offset compensation mode, the robot cleaner is maintained in the stop state (step S14) and an offset value of the gyro sensor is detected. That is, in a state that the robot cleaner temporarily stops, the predetermined number of output values of the gyro sensor is collected (step S15). Herein, when the robot cleaner stops (that is, when the rotation speed is 0), the output value of the gyro sensor becomes an offset value of the gyro sensor. In this respect, because there is a noise component whenever measured and the offset value is changed over time, it is preferred to use an average value and a standard deviation in order to obtain an accurate offset value of the gyro sensor.

When the offset value of the gyro sensor is detected, an average value of the obtained offset values of the gyro sensor and a standard deviation are obtained. The average value and the standard deviation are calculated through below equation (4). That is, equation (4) is to obtain an average value of the output values of the gyro sensor and the standard deviation when the robot cleaner temporarily stops.

$$m_{G,1} = \frac{\sum_{i=1}^{N} G_i}{N}, \sigma_{G,1}^2 = \frac{\sum_{i=1}^{N}(G_i - m_{G,1})^2}{N} \quad (4)$$

wherein $m_{G,1}$ is an average value of the output values of the gyro sensor, 'N' is the number of samplings of the gyro sensor, $G_i$ is an output value of the gyro sensor, $\sigma_{G,1}$ is a standard deviation of the output value of the gyro sensor (step S16).

Thereafter, the offset values of the gyro sensor without a noise are averaged on the basis of the standard deviation, and the averaged offset value is determined as a new gyro offset value ($G_{offset,new}$). At this time, the new gyro offset value ($G_{offset,new}$) is calculated through below equation (5). That is, equation (5) is to obtain the average value of the gyro sensor values without a noise by probability, and the obtained average value becomes the new gyro offset value (step S17).

$$G_{offset,new} = m_{G,2} = \frac{\sum_{i=1}^{N} G_i V_i}{\sum_{i=1}^{N} V_i} \quad (5)$$

wherein $m_{G,2}$ is an average value of the offset values of the gyro sensor without a noise, and $G_i$ is an offset value of the gyro sensor. When the rotation speed is 0, an output value of the gyro sensor is an offset value of the gyro sensor.

In addition, if the offset value of the gyro sensor is a noise by probability, $V_i$ is 0, otherwise, it is 1. That is, if $|G_i - m_{G,1}| < k_1 \cdot \sigma_{G,1}$ then $V_i$ is '1', while if $|G_i - m_{G,1}| \geq k_1 \cdot \sigma_{G,1}$, then $V_i$ is '0'. At this time, the angular velocity ($\omega_n$) is calculated on the basis of the new gyro offset value ($G_{offset,new}$). Namely, the angular velocity $\omega_n = C(G_n - G_{offset,new})$.

Thereafter, the angular velocities ($\omega_n$) calculated on the basis of the new gyro offset value are accumulatively added up and a rotation amount of the robot cleaner is calculated through an equation $\Psi_{n+1} = \Psi_n + \omega_n \cdot \Delta t$. And then, the calculated rotation amount is subtracted from a previously calculated rotation amount, and the subtracted rotation amount is compensated to thereby reduce a rotational position error of the robot cleaner. That is, whenever the new gyro offset value is determined, the rotation amount according to the change in the gyro offset is compensated, thereby reducing the rotational position error of the robot cleaner (step S18).

A method for calculating the rotation amount of the robot cleaner on the basis of the new gyro offset value and compensating the calculated rotation amount will now be described in detail with reference to FIGS. 4A~4D.

FIGS. 4A to 4D show processes for compensating a rotational amount on the basis of a new offset value in accordance with the preferred embodiment of the present invention.

Figure 4A:
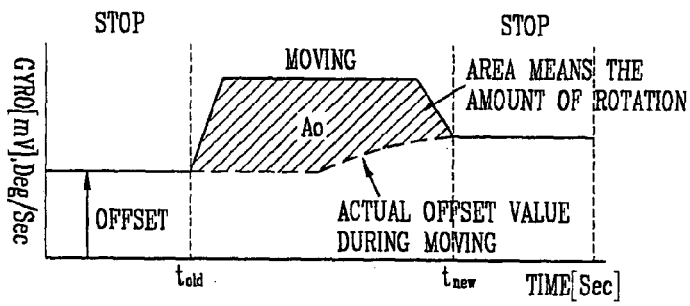
FIGS. 4A to 4D show processes for compensating a rotational amount on the basis of a new gyro offset value in accordance with the preferred embodiment of the present invention.

With reference to FIG. 4A, when the robot cleaner is moved in the stop state, an offset value of the gyro sensor is changed during the time interval of told to $t_{new}$ while the robot cleaner is being moved. A shaded area indicates an actual rotation amount of the robot cleaner. However, if the gyro offset value is changed while the robot cleaner is being moved during the time interval of told to the time interval of $t_{new}$, the change amount can not be known. Thus, the shaded area of FIG. 4A can accurately obtained by using the gyro sensor.

Figure 4B:
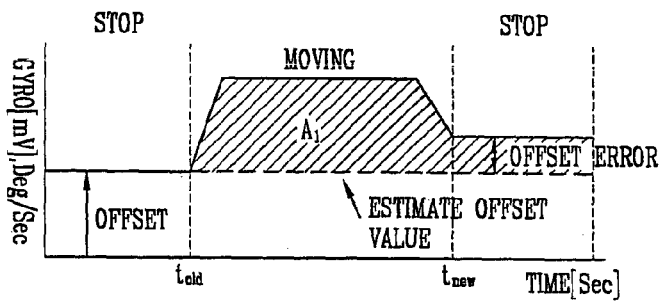

With reference to FIG. 4B, due to the changed offset value, there occurs a rotational position error, and the robot cleaner can not perform a cleaning operation due to the error. A shaded area of FIG. 4B indicates the amount of rotation of the robot cleaner obtained by calculating the angular velocities when assuming the gyro offset value as a constant and accumulatively adding the calculated angular velocities.

At this time, the rotational position error is the area obtained by subtracting the shaded area of FIG. 4A from the shaded area of FIG. 4B. That is, the rotational position error ($Err_1=A_1-A_0$) according to the gyro offset gradually increases as time passes.

Figure 4C:
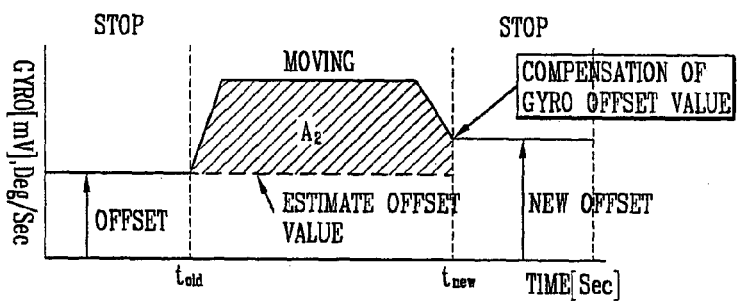

With reference to FIG. 4C, the amount of rotation is calculated on the basis of the offset value ($G_{offset}$) of the gyro sensor during the time interval ($t_{new} \sim t_{old}$) before the new gyro offset value ($G_{offset,new}$) is determined, which, however, fails to reflect the offset value of the gyro sensor changed during the time interval ($t_{new} \sim t_{old}$).

In order to reflect to the changed offset value of the gyro sensor, the rotational position error of the robot cleaner is compensated on the basis of the new gyro offset value. The rotational position error of the gyro offset is $Err_2=A_2-A_0$, and its size is smaller than the rotational position error of FIG. 4B.

Figure 4D:
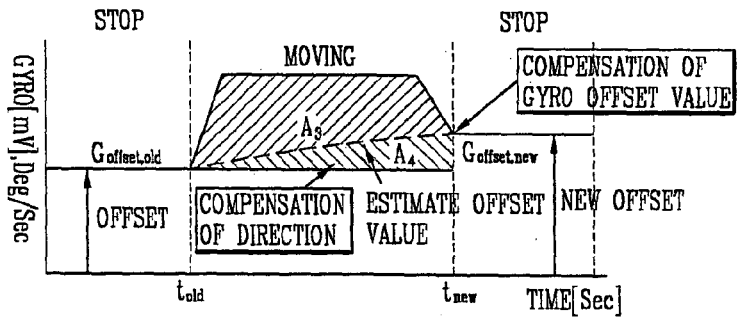

Accordingly, as shown in FIG. 4D, when the previous gyro offset ($G_{offset,old}$) is linearly changed to the new gyro offset, the amount of rotation according to the gyro offset during the time period ($t_{new} \sim t_{old}$) is calculated, the calculated amount of rotation is subtracted from the amount of rotation according to the previously calculated gyro offset, and the subtracted amount of rotation is compensated, thereby reducing a rotational position error of the robot cleaner. The compensated amount of rotation is obtained by below equation (6):

$$\Psi_{n+1} = \Psi_{n+1,previous} - \Psi_{compensation} = \Psi_{n+1} - \tfrac{1}{2}(G_{offset,new} - G_{offset,old}) \cdot (t_{new} - t_{old}) \quad (6)$$

wherein $\psi_{n+1}$ is the compensated amount of rotation of the robot cleaner, $\psi_{n+1,previous}$ is the amount of rotation of the robot cleaner before compensation, and $\psi_{compensation}$ is the rotation compensation amount of the robot cleaner. $\psi_{compensation}$ corresponds to $A_4$ of FIG. 4D, and in this case, a rotational position error according to the gyro offset is $Err_3 = A_3 - A_0 = (A_2 - A_4) - A_0$. That is, the rotational position error of the robot cleaner can be expressed in order from FIGS. 4A~4D by $Err_1 > Err_2 > Err_3$.

Meanwhile, in the present invention, the rotational position error of the robot cleaner can be reduced by compensating an offset value of various sensors which detects a rotation speed (angular velocity) of the robot cleaner.

As so far described, the method for compensating a rotational position error of a robot cleaner in accordance with the present invention has the following advantages.

That is, for example, an offset value of the gyro sensor detecting a rotation speed of the robot cleaner is detected whenever the robot cleaner temporarily stops and the detected offset value of the gyro sensor is compensated, so that a rotational position error of the robot cleaner can be reduced.

In addition, when an offset value of the gyro sensor when the robot cleaner temporarily stops after a certain time lapse is sharply changed or when a cleaning step is changed, an offset value of the gyro sensor of the robot cleaner is detected. Accordingly, the offset value can be accurately detected, and thus, a rotational position error according to the change in the offset of the gyro sensor can be minimized.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for compensating a rotational position error of a robot cleaner comprising:
   detecting an offset value of a sensor for detecting a rotational speed of a robot cleaner;
   compensating the detected offset value; and
   correcting a rotational position of the robot cleaner on the basis of the compensated offset values,
   wherein compensating the offset value comprises obtaining an average value of the detected offset values and a standard deviation, averaging the noise-removed offset value on the basis of the average value and the standard deviation, and determining the averaged offset value as a new offset value.

2. The method of claim 1, wherein the sensor is a gyro sensor.

3. The method of claim 2, wherein the step of correcting the rotational position of the robot cleaner comprises:
   calculating angular velocities of the robot cleaner on the basis of the compensated offset value of the gyro sensor;
   calculating the amount of rotation of the robot cleaner by accumulatively adding the calculated angular velocities; and
   subtracting the calculated amount of rotation from the previous amount of rotation, and compensating the subtracted amount of rotation.

4. The method of claim 2, wherein the step of compensating the offset value comprises:
   obtaining an average value of the offset values detected by the gyro sensor when the robot cleaner temporarily stops and a standard deviation; and
   averaging the average value and the standard deviation, and determining the averaged offset value as a new offset value.

5. The method of claim 2, wherein the step of correcting the rotational position of the robot cleaner comprises:
   calculating angular velocities of the robot cleaner on the basis of the compensated offset value;

calculating the amount of rotation of the robot cleaner by accumulatively adding the calculated angular velocities; and subtracting the calculated amount of rotation from the previous amount of rotation, and compensating the subtracted amount of rotation.

6. The method of claim 1, wherein, in the step of detecting an offset value, an offset value of the sensor is detected whenever the robot cleaner temporarily stops.

7. The method of claim 1, wherein the average value and the standard deviation is calculated by an equation of $$m_{G,1} = \frac{\sum_{i=1}^{N} G_i}{N}, \sigma_{G,1}^2 = \frac{\sum_{i=1}^{N} (G_i - m_{G,1})^2}{N},$$

wherein $m_{G,1}$ is an average value of the output values of the gyro sensor, 'N' is the number of samplings of the gyro sensor, $G_i$ is an output value of the gyro sensor, $\sigma_{G,1}$ is a standard deviation of the output value of the gyro sensor.

8. The method of claim 1, wherein the new offset value is calculated by an equation of $$G_{offset,new} = m_{G,2} = \frac{\sum_{i=1}^{N} G_i V_i}{\sum_{i=1}^{N} V_i},$$

wherein $m_{G,2}$ is an average value of the noise-removed offset values, $G_i$ is an output value of the gyro sensor, and if $|G_i - m_{G,1}| < k_1 \cdot \sigma_{G,1}$, $V_i$ is '1', while if $|G_i - m_{G,1}| \geq k_1 \cdot \sigma_{G,1}$, $V_i$ is '0'.

9. The method of claim 1, wherein the step of correcting a rotational position of the robot cleaner comprises:

calculating an angular velocities of the robot cleaner on the bass of the new offset value;

calculating the amount of rotation of the robot cleaner by accumulatively adding the calculated angular velocities; and subtracting the calculated amount of rotation from the previous amount of rotation, and compensating the subtracted amount of rotation.

10. A method for compensating a rotational position error of a robot cleaner comprising:

detecting an offset value of a gyro sensor after stopping a robot cleaner for a predetermined time when the robot cleaner is in an offset compensation mode;

obtaining an average value of the detected offset values and a standard deviation;

averaging the noise-removed offset value on the basis of the average value and the standard deviation;

determining the averaged offset value as a new gyro offset value; and compensating a rotational position error of the robot cleaner on the basis of the new gyro offset value.

11. The method of claim 10, wherein the offset compensation mode is performed at a point when the robot cleaner starts a cleaning operation.

12. The method of claim 10, wherein the offset compensation mode is performed at a start point of a step of creating map information on a cleaning region and performing a cleaning in a certain pattern on the basis of the map information.

13. The method of claim 10, wherein the offset compensation mode is performed at a point when the robot cleaner starts moving to a charger.

14. The method of claim 10, wherein the offset compensation mode is performed at each predetermined time.

15. The method of claim 10, wherein the offset compensation mode is performed when a difference between the sample average value of the offset values of the gyro sensor and the detected gyro offset value is greater than a predetermined value.

16. The method of claim 15, wherein the sample average value of the gyro offset values is calculated by an equation of $$G_{offset,sample} = \frac{\sum_{i=1}^{S} G_i}{S},$$

wherein 'S' is the number of samples of output values of the gyro sensor that can be collected when the robot cleaner instantly stops, $G_i$ is an output value of the gyro sensor when the robot cleaner instantly stops, and $G_{offset,sample}$ is an average value of output values of the gyro sensor when the robot cleaner instantly stops.

17. The method of claim 10, wherein the average value of the offset values and the standard deviation are calculated by an equation of $$m_{G,1} = \frac{\sum_{i=1}^{N} G_i}{N}, \sigma_{G,1}^2 = \frac{\sum_{i=1}^{N} (G_i - m_{G,1})^2}{N},$$

wherein $m_{G,1}$ is an average value of the output values of the gyro sensor, 'N' is the number of samplings of the gyro sensor, $G_i$ is an output value of the gyro sensor, $\sigma_{G,1}$ is a standard deviation of the output value of the gyro sensor.

18. The method of claim 10, wherein the new gyro offset value is calculated by an equation of $$G_{offset,new} = m_{G,2} = \frac{\sum_{i=1}^{N} G_i V_i}{\sum_{i=1}^{N} V_i},$$

wherein $m_{G,2}$ is an average value of the noise-removed output values, $G_i$ is an output value of the gyro sensor, and if $|G_i - m_{G,1}| < k_1 \cdot \sigma_{G,1}$ $V_i$ is '1', while if $|G_i - m_{G,1}| \geq k_1 \cdot \sigma_{G,1}$, $V_i$ is '0'.

19. The method of claim 10, wherein the step of compensating the rotational position error of the robot cleaner comprises:

calculating an angular velocities of the robot cleaner on the bass of the new offset value;

calculating the amount of rotation of the robot cleaner by accumulatively adding the calculated angular velocities; and subtracting the calculated amount of rotation from the previous amount of rotation, and compensating the subtracted amount of rotation.

20. The method of claim 19, wherein the compensated amount of rotation is calculated by an equation of $\Psi_{n+1} = \Psi_{n+1,previous} - \Psi_{compensation} = \Psi_{n+1} - \frac{1}{2}(G_{offset,new} - G_{offset,old}) \cdot (t_{new} - t_{old})$, wherein $\psi_{n+1}$ is the compensated amount of rotation of the robot cleaner, and $\psi_{n+1,previous}$ is the amount of rotation of the robot cleaner before compensation, and $\psi_{compensation}$ is the rotation compensation amount of the robot cleaner.

* * * * *